United States Patent [19]

Munetsugu

[11] Patent Number: 4,519,044

[45] Date of Patent: May 21, 1985

[54] SMALL-SIZED ELECTRONIC CALCULATOR CAPABLE OF FUNCTIONING AS A MUSICAL INSTRUMENT

[75] Inventor: Eiichi Munetsugu, Yokohama, Japan

[73] Assignee: Tokyo Shibaura Denki Kabushiki Kaisha, Kawasaki, Japan

[21] Appl. No.: 319,412

[22] Filed: Nov. 9, 1981

[30] Foreign Application Priority Data

Nov. 13, 1980 [JP] Japan ............................ 55-159925

[51] Int. Cl.$^3$ ............................ G06F 3/16

[52] U.S. Cl. ............................ 364/709; 364/710; 84/1.01

[58] Field of Search ............................ 364/710, 709, 705; 84/1.01

[56] References Cited

U.S. PATENT DOCUMENTS

| | | | |
|---|---|---|---|
| 3,955,074 | 5/1976 | Rodé et al. | 364/709 |
| 4,294,154 | 10/1981 | Fujisawa | 84/1.01 |
| 4,336,598 | 6/1982 | Yanagawa | 364/710 |
| 4,354,246 | 10/1982 | Fujisawa | 364/709 |

*Primary Examiner*—Jerry Smith
*Assistant Examiner*—Michael R. Fleming
*Attorney, Agent, or Firm*—Finnegan, Henderson, Farabow, Garrett & Dunner

[57] ABSTRACT

When a mode changeover switch is shifted to musical instrument mode position and a key scale assigning key is operated, symbol "#" or "b" is displayed on a display means according to the selected key scale. Numeral keys and a decimal point key are then operated to play a wide variety of musical tones on the selected key scale.

1 Claim, 6 Drawing Figures

FIG. 2
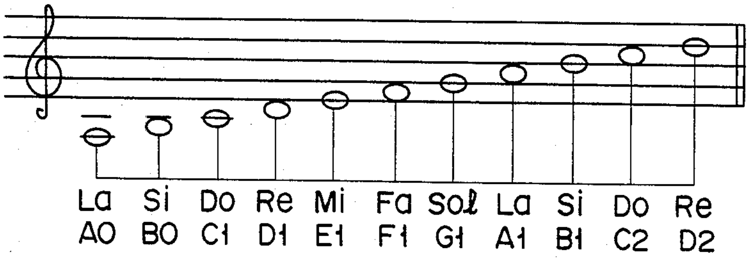
FIG. 3
| | KEY OPERATION | SCALE | KEY |
|---|---|---|---|
| (A) | KEY |  | C MAJOR |
| (B) | KEY |  | G MAJOR |
| (C) | KEY |  | F MAJOR |
| (D) | KEY |  | C MAJOR |
FIG. 6
| OUTPUT LINE | X0 | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|---|
| TONE NAME | La | Si♭ | Si | Do | Re | Mi | Fa | Fa♯ | So | La | Si | Si♭ | Do | Re | – | – |
| PITCH | A0 | B0♭ | B0 | C1 | D1 | E1 | F1 | F1♯ | G1 | A1 | B1 | B1♭ | C2 | D2 | – | – |

SMALL-SIZED ELECTRONIC CALCULATOR CAPABLE OF FUNCTIONING AS A MUSICAL INSTRUMENT

BACKGROUND OF THE INVENTION

The present invention relates to a small-sized electronic calculator capable of functioning as a musical instrument wherein a plurality of input keys to which numeral values or arithmetically-processing instructions applied are used as performing keys.

Following the recent progress of LSI (large-scale integrated circuit), the small-sized electronic calculator has been made smaller and smaller and to have additional functions such as timer and musical instrument functions in addition to calculator function. When the small-sized electronic calculator is used as a musical instrument, the mode changeover switch is changed over to musical instrument mode position and a plurality of input keys to which numeral values or arithmetically-processing instructions are applied are used as performing keys of musical instrument. However, input keys of small-sized electronic calculator are not so many as those of a piano and the small-sized electronic calculator is therefore limited in tone and music it can perform.

SUMMARY OF THE INVENTION

The object of the present invention is therefore to provide a small-sized electronic calculator capable of functioning as a musical instrument and performing music of various keys such as C, F and G major using the limited number of input keys.

According to the present invention there is provided a small-sized electronic calculator capable of functioning as a musical instrument and including a plurality of input keys to which numeral values or arithmetically-processing instructions are applied, an arithmetic circuit for carrying out a predetermined operation responsive to inputs applied from these input keys, and a display means for displaying the result of operations carried out by the arithmetic circuit, the small-sized electronic calculator further including a mode changeover means for setting input keys to performing keys, means for assigning the key of scales created by operating input keys which are now used as performing keys, means for selecting tone data of an interval according to the key assigned by the key assigning means, said interval being determined corresponding to each of input keys, means for generating tone signal according to selected tone data, and a display means for displaying the key assigned by the key assigning means.

BRIEF DESCRIPTION OF THE DRAWINGS

FIG. 2 shows the relation between tone name and pitch in C major scale;

FIG. 3 shows the relation between key and contents displayed in the display section shown in FIG. 1;

FIG. 6 shows the relation between code decoder output line, tone name and pitch.

DETAILED DESCRIPTION OF THE PREFERRED EMBODIMENT

Figure 1:
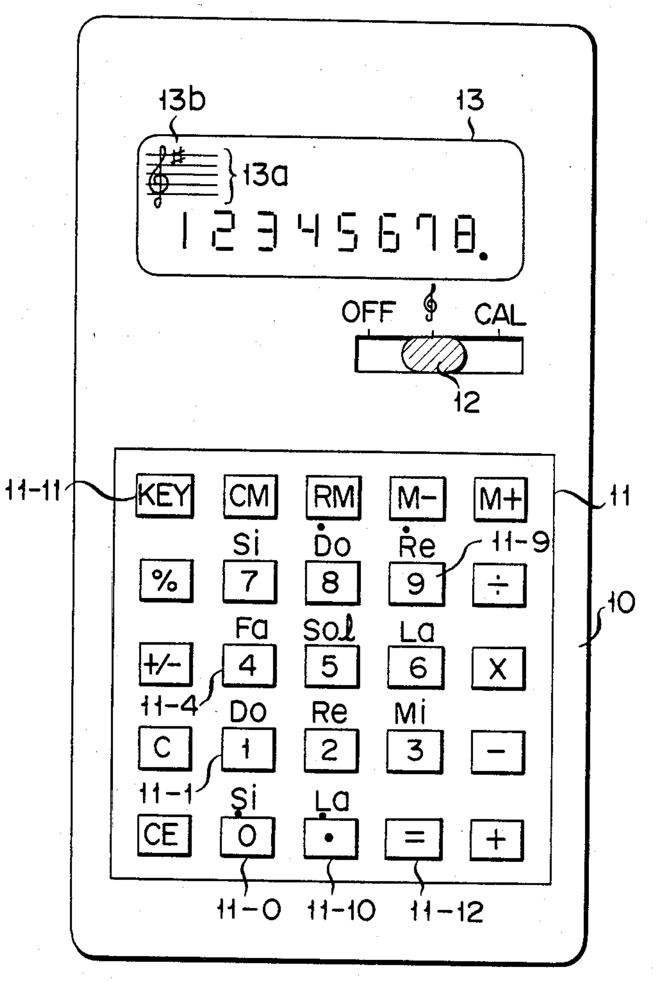
FIG. 1 is a plan view showing the panel of a small-sized electronic calculator according to one embodiment of the present invention.

Referring to FIG. 1, a plurality of input keys 11-0, 11-1, . . . to which numeral values or arithmetically processing instructions are applied are arranged in rows and columns on a keyboard 11 of a panel 10. Tones ranging from tone name La to octave Re of C major are assigned to a decimal point key 11-10 and then numeral keys 11-0, 11-1, . . . , 11-9, respectively. FIG. 2 shows the relation between input keys 11-0 to 11-10 (tone names La to octave Re) and positions of notes of C major. An input key 11-11 is a key assigning switch to assign the keys C, F and G major, successively, in this embodiment.

A mode assigning switch 12 and a display device 13 are also arranged in the panel 10. The mode assigning switch 12 has three positions which are "OFF" position of an electric power, musical instrument mode position represented by a symbol 𝄞, and calculator (CAL) mode position. The display device is of liquid crystal display type and can display eight-figure numbers and a decimal point. At the left corner of display section 13 are previously printed a score 13*a* and a G clef 𝄞. A sharp (♯) 13*b* is also displayed on the fifth line of score 13*a* and it will be understood that G major scale is now set by the operation of key assigning key 11-11. FIG. 3 shows the relation between the key operation of key assigning key 11-11 and key display. Key operation is carried out in the order of (A), (B) and (C), and the key assigned at (D) is same as at (A). Namely, when the key 11-11 is once pushed under the condition (C major) of (A), the key is changed over to the condition of (B), so that F-sharp "♯" 13*b* is displayed on the score 13*a* and music can be played on G major scale. Sharp (♯) is added this time to the tone of fa ($F_1$) in FIG. 2 and this tone is made higher by a semi tone to be sounded as $F_1$♯. Numeral keys 11-0 to 11-9 and decimal point key 11-10 are set to G major scale as described above.

When the key 11-11 is again pushed, the condition is changed over to the condition of (C) and B-flat "b" is displayed on the third line of score 13*a* as shown in FIG. 3, thus allowing music to be played in the key of F major. Flat (b) is added this time to the two "B" tones Si different by one octave from each other and corresponding to tones $B_0$ and $B_1$ in FIG. 2 and these tones are made lower by a semi tone to be sounded as $B_0{}^b$ and $B_1{}^b$. Music can be thus played in the key of F major when the key is set at (C) in FIG. 3. When the key 11-11 is pushed once again, the condition is changed over to the C major condition of (D), which is the same as at (A) as already described above. When the mode changeover switch 12 is changed over from "OFF" position to "𝄞" position, it may be arranged that the condition (A) of C major is immediately set without pushing the key 11-11.

Although G clef 𝄞 is previously printed on the score 13*a* in the display device 13 since all of scales changed over by the operation of key 11-11 are major scales, G clef "𝄞" and F clef "𝄢" may be displayed on the score 13*a* by the operation of key 11-11 when it is intended that the key can be changed over to both of major and minor scales.

Arrangement and operation of this embodiment will now be described in detail referring to FIGS. 4 and 5. Key switches corresponding to keys 11-0 to 11-11 and other function keys are arranged at cross points on the keyboard 11 where row lines x1–x8 cross column lines y1–y4. The signal generated when one of the keys on the keyboard 11 is pushed is supplied via four output lines y1–y4 to a four-bit key data register 21, which includes four flip-flops 21a–21d weighted like 1-2-4-8. Key data thus converted to parallel signal of four bits is supplied via a data bus 22 to an operation or arithmetic circuit 23. The latter sequencially applies key switch signal codes to a four-bit register 25 through a bus 24. A key switch signal code temporarily stored in the register 25 is supplied to a key switch signal generating decoder 26 and is decoded to produce a key row signal on one of the key row lines x1–x8. If a key in the row is activated, a signal will thus simultaneously appear on a line y1–y4 and will, taken with the code in register 25, represent the key which is pushed. The arithmetic circuit 23 is thus able to determine the activated key from the signal received on line 22.

The arithmetic circuit 23 and a ROM address determining circuit 27 are connected with each other by a data bus 28, through which a signal representing whether or not data is present in arithmetic registers (not shown) arranged in the arithmetic circuit 23 and a carrier signal or a signal judging the status of arithmetic circuit 23 are supplied to the address determining circuit 27. The address determining circuit 27 serves to decode these signals and supplies address signals to a program ROM 29, in which are previously stored micro-instructions by which arithmetic operation is carried out during the calculation mode and by which tone generating operation is achieved at the time of music instrument mode in this embodiment of small-sized electronic calculator. When data is present in arithmetic registers, the program ROM 29 applies a micro-instruction from an address, to which access has been applied through the address determining circuit 27, to an instruction decoder 31 through a data bus 30 while a RAM address assigning signal is applied to a RAM column/row determining circuit 33 through an address bus 32. The instruction decoder 31 decodes the micro-instruction applied and supplies the output to the arithmetic circuit 23 through a bus 34, thus causing the arithmetic circuit 23 to perform a predetermined operation. Data read out from data RAM 36, to which access has been applied by the determining circuit 33 via an address bus 35, is supplied via a data bus 37 to the arithmetic circuit 23, or data representing the arithmetic result carried out in the arithmetic circuit 23 is stored in the data RAM 36. When a step of arithmetic operation is finished like this in the arithmetic circuit 23, a signal for assigning a next address in the program ROM 29 is supplied from the program ROM 29 to the ROM address determining circuit 27 through an address bus 38. As a result, the address determining circuit 27 applies to the program ROM 29 an address signal for reading out the next step of the program. Arithmetic operation is carried out in the arithmetic circuit 23 according to the program thus stored in the program ROM 29 and responsive to data and arithmetically-processing instruction applied from the keyboard. The result of the arithmetic operation is finally stored in the data RAM 36 and, as the result, data is supplied via a data bus 39 to a display buffer 40. Timing signal formed by supplying reference pulse generated from a reference pulse generator circuit 41 to a timing generator circuit 42 is supplied via a control bus 43 to the display buffer 40. Data temporarily stored in the display buffer 40 is supplied under the control of the timing signal to the display device 13 and displayed there visually. The timing generator circuit 42 further supplies a variety of timing signals to those sections which are shown in FIG. 4, but the supply of these signals is not shown in FIG. 4.

Scale code data is further supplied from the arithmetic circuit 23 to the bus 24 and stored temporarily in a four-bit register 44. Scale code data temporarily stored in the register 44 is then supplied to a scale decoder 45 where a signal for assigning the frequency or musical tone is formed. This frequency assigning signal is supplied to the control input terminal of a frequency divider 46, which divides a reference frequency signal applied from the reference pulse generator circuit 41 with by a dividing ratio determined by the frequency assigning signal. Therefore, a tone signal having a frequency selected by the scale decoder 45 is obtained through the divider 46 and supplied to a sounding device 47 such as a speaker or piezo-electric buzzer.

Figure 4:
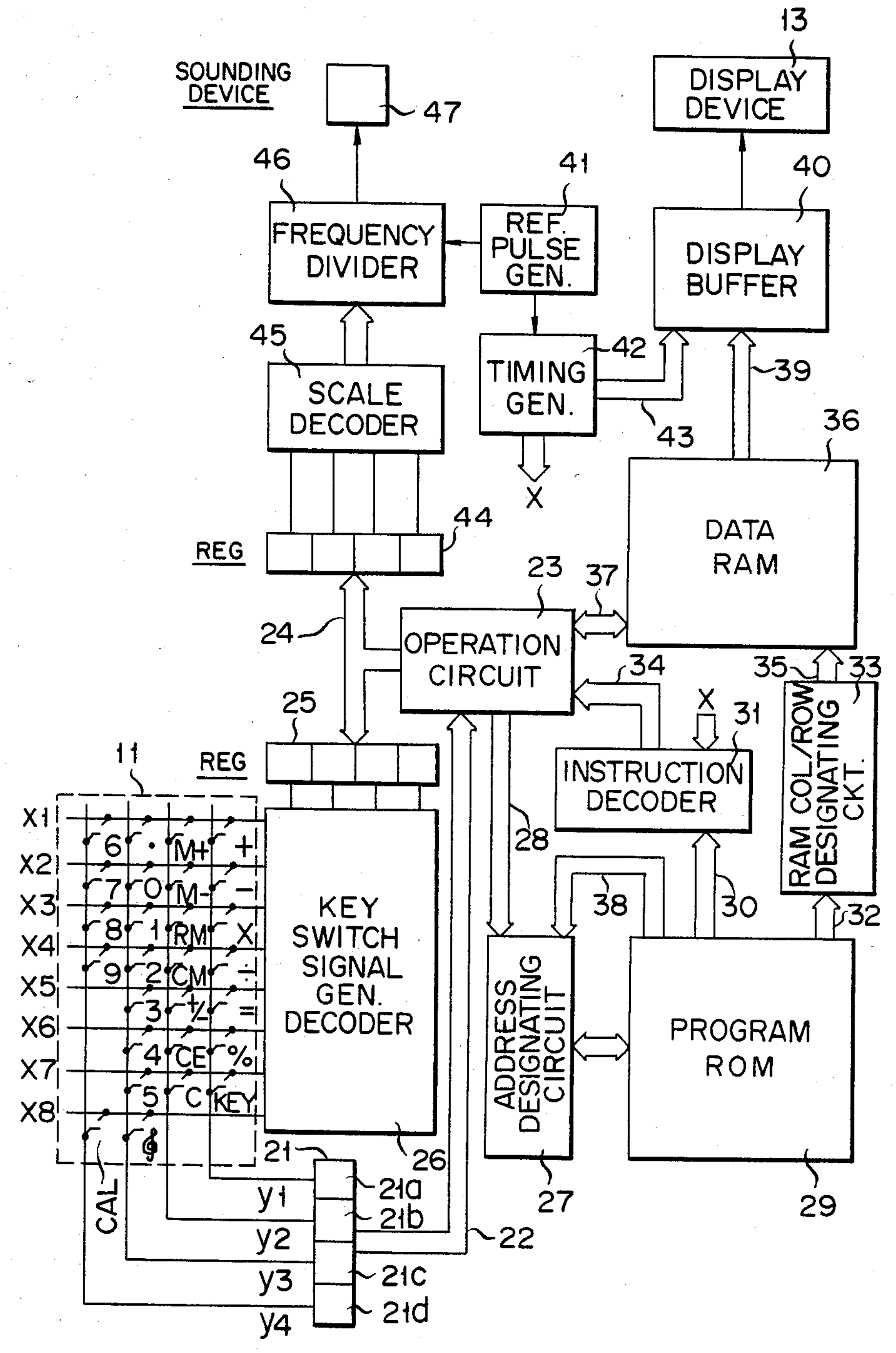
FIG. 4 is a block diagram showing the arrangement of the embodiment shown in FIG. 1.
Figure 5:
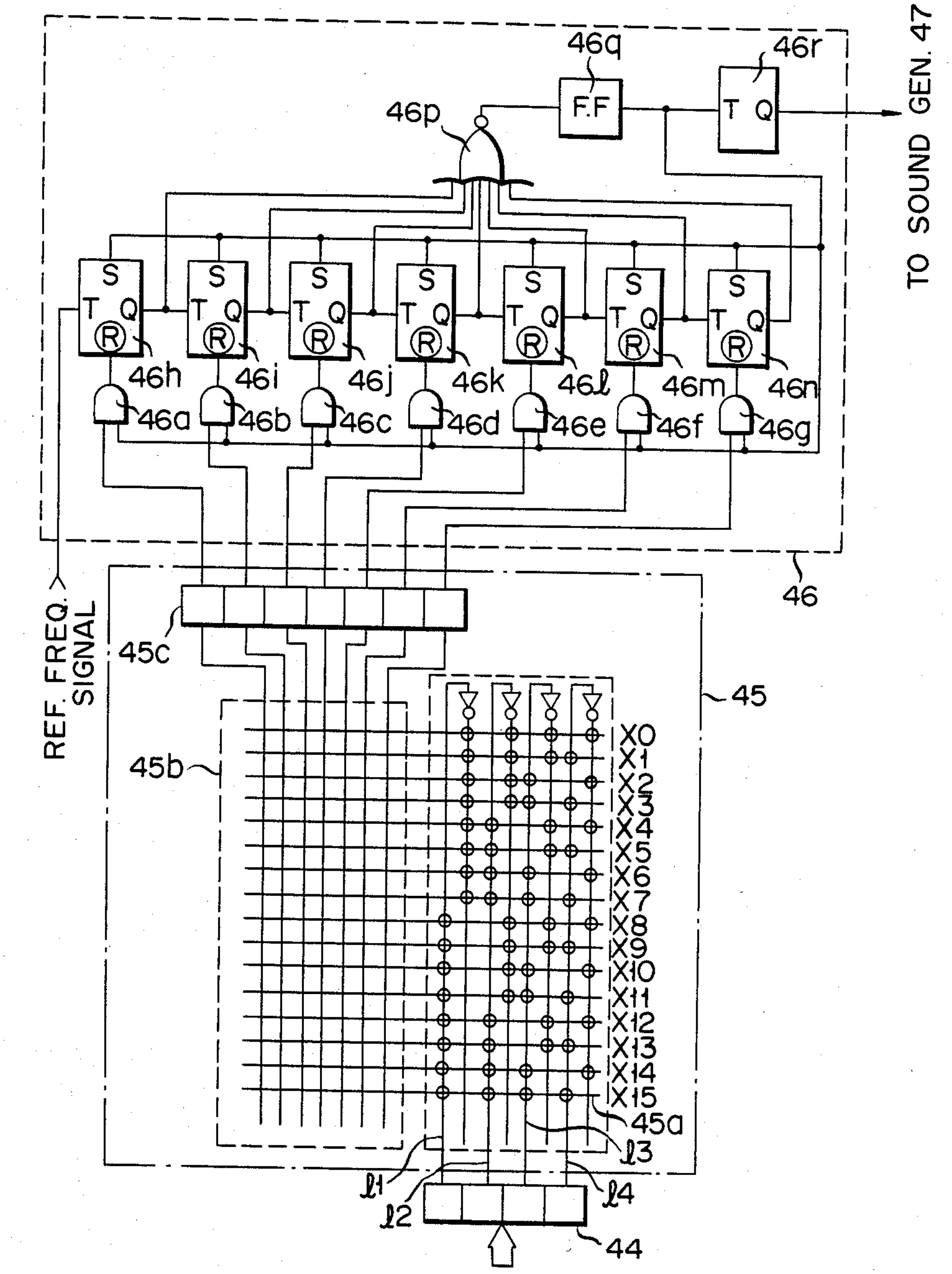
FIG. 5 is a block diagram showing in more detail a part of the circuit shown in FIG. 4.

FIG. 5 shows in more detail the construction of the scale code register 44 and the frequency divider 46 shown in FIG. 4. Four-bit scale code data temporarily stored in the register 44 is supplied every bit to four input lines l1, l2, l3 and l4 of a code decoder 45a arranged in the scale decoder 45. The code decoder 45a has sixteen output lines X0, X1, . . . , X15 and four-bit input code data decoded is supplied to a ROM 45b as address signal. FIG. 6 shows the relation between output (output "1", for example) appearing on each of output lines X0–X15 and tone name and pitch of tone generated. Output lines X14 and X15 may be assigned to codes by which no tone is generated like a rest, for example.

Responsive to address signal applied through output lines X0–X15, the ROM 45b applies dividing ratio assigning data, as seven-bit data, to the frequency divider 46 through a register 45c. Each bit signal of dividing ratio assigning data temporarily stored in the register 45c is supplied to one input terminal of each of AND gates 46a–46g in the frequency divider 46, said one input terminal being the control signal input terminal. Each of outputs of AND gates 46a–46g is supplied to a reset terminal R of each of binary counters 46h–46n. These binary counters 46h–46n are set to give priority to resetting operation. To a terminal T of binary counter 46h is supplied reference frequency signal from the reference pulse generator circuit 41. Output Q of binary counter 46h is supplied to a terminal T of next stage binary counter 46i and an input terminal of a NOR circuit 46p. Output Q of binary counter 46i is supplied to a terminal T of next stage binary counter 46j and another input terminal of NOR circuit 46p. Similarly, output Q of each of binary counters 46j–46m is connected to a terminal T of its next stage binary counter and a different input terminal of NOR circuit 46p. Output Q of final stage binary counter 46n is connected to a seventh input terminal of NOR circuit 46p. Output of NOR circuit 46p is supplied to a flip-flop circuit 46q and temporarily stored there. Output of flip-flop circuit 46q is supplied to a terminal T of a binary counter 46r and a set terminal S of each of binary counters 46h–46n while to the other input terminal of each of AND circuits 46a–46g. Output Q of binary counter 46r is supplied, as tone signal, to the sounding device 47 shown in FIG. 4.

The operation of this embodiment having such an arrangement as described above will now be described. When the mode assigning switch 12 is shifted from "OFF" position to musical instrument mode position represented by symbol "𝄞", only symbol "𝄞" corresponding to C major in FIG. 3 is displayed at the left upper corner of display section 13. Namely, input signal from switch (corresponding to the switch 12) represented by symbol " " in the keyboard 11 of FIG. 4 is supplied via the register 21 to the arithmetic circuit 23. As previously explained, the key switch code which is temporarily stored in the register 25 is supplied to the key switch signal generating decoder 26 and produces a key row signal which is supplied to the arithmetic circuit 23 via line 22, indicating that the switch 12 represented by symbol " " has been operated. As the result, responsive to an address signal applied from the program ROM 29 to which access has been applied through the address determining circuit 27, the code for displaying the G clef "𝄞" is read out from the data RAM 36 and a signal representing the G clef "𝄞" is supplied from the display buffer 40 to the display device 13.

When the key 11-11 of key assigning switch is then pushed, the input key switch signal is supplied to the arithmetic circuit 23. In this embodiment, contents displayed by the display device 13 are changed over in the order of (A), (B), (C) and (D), as shown in FIG. 3, every time when the key 11-11 is pushed and the key of music being played by using numeral keys 11-0 to 11-9 and the decimal point key 11-10 is thus changed over from C major to G, F and C major, successively. Contents of key assigning code stored in a specified area of data RAM 36 and address-assigned by the arithmetic circuit 23 are changed every time when the key 11-11 is pushed. Namely, key assigning code stored in the data RAM 36 is read out to the display buffer 40 and symbols "#" and "b" are selectively displayed by the display device 13.

System operation will now be described for the case where the key 11-11 is pushed while the C major scale is displayed, whereby the G major scale and symbol "#" are displayed by the display device 13 as shown in FIG. 1.

Thereafter, when for example the key switch 11-4 is pushed, a key row signal representing the key "4" is supplied via the register 21 to the arithmetic circuit 23. The key pushed is judged by the arithmetic circuit 23 using this key switch signal code and the key switch signal code stored in the register 25, and it is thus detected by the arithmetic circuit 23 that the key 11-4 has been operated. At substantially the same time the key assigning code for G major stored in the specified area of data RAM 36 is read out and supplied to the arithmetic circuit 23. Using code of key 11-4 and key assigning code of G major, the arithmetic circuit 23 reads out from the data RAM 36 tone code "0111" representing tone of Fa# ($F_1$#) and causes it to be temporarily stored in the register 44. This tone code "0111" is supplied from the register 44 to the code decoder **45*a* (FIG. 5) and as result, the output line X7 is selected. Tone code "0111" is therefore applied via the output line X7 to the ROM 45*b* and decoded there to produce an address signal which is supplied to ROM 45*b*. In response to the address signal, a frequency division code is supplied from the ROM 45*b* to the register 45*c* and temporarily stored there. The frequency division code stored in the frequency division register 45*c* is supplied through each of AND circuits 46*a*–46*g* to the reset terminal of each of binary counters 46*h*–46*n*. Binary counters 46*h*–46*n* are successively operated step by step responsive to reference frequency signal applied from the reference pulse generator circuit 41. When all outputs Q of binary counters 46*h*–46*n* become "0", signal "1" is applied from the NOR circuit 46*p* to set the flip-flop 46*q*. As the result, gates of AND circuits 46*a*–46*g* are opened and all of binary counters 46*h*–46*n* are set. Those of binary counters 46*h*–46*n* having reset terminals applied with outputs from the selected AND gates 46*a*–46*g* according to dividing ratio data stored in the register 45*c* are thus reset. In short, when a large value is set in the register 45*c*, a small value inversely proportional to the large value is set in binary counters 46*h*–46*n*. The time period starting when this value is set in binary counters 46*h*–46*n* and ending when all outputs Q of binary counters 46*h*–46*n* become "1" is made longer in this case. Therefore, the time period during which the flip-flop 46*q* is once set and set again is made longer. Pulses of frequency previously stored in the ROM 45*b* are thus obtained as outputs of flip-flop 46*q*. This pulse output is shaped by the binary counter 46*r* to have a duty cycle of ½ and supplied, as tone signal of pitch of Fa# ($F_1$#), to the sounding device 47. Similarly, every time when one of numeral keys 11-0 to 11-9 and the decimal point key 11-10 is pushed, one of output lines X0–X15 corresponding to the pushed key is selected and tone of pitch corresponding to the pushed key is sounded through the device 47. It is arranged, for example, that the key 11-12 of keyboard 11 represented by symbol "=" is assigned as a rest key and that the output line X14 or X15 is selected when the key 11-12 is pushed. When the ROM 45*b* is set in such a way that contents of registers become "1111111" in this case, all outputs Q of binary counters 46*h*–46*n* become "0", thus keeping the flip-flop 46*q* set. Therefore, no tone signal is generated through the binary counter 46*r*** and a rest period is thus obtained corresponding to the rest.

Although three kinds of key such as C, G and F majors can be assigned in the above-described embodiment of the present invention, it may be arranged that several keys of minor scale can be assigned or that both of major and minor scales can be assigned. The number of keys to be assigned is not limited to three kinds but may be appropriately increased. Although the key assigning key 11-11 is used as a touch switch in this embodiment, a locking switch may be employed. The number of symbols "#" and "b" displayed on the display device 13 can be certainly changed corresponding to keys selected.

As described above, the present invention enables keys of major and minor scales to be assigned by the key switch and the pitch of a predetermined tone to be made higher or lower by a semi tone corresponding to the key pushed, so that a wide variety of melodies can be played using a small number of keys.

What is claimed is:

1. An electronic musical tone generating system operable in conjunction with an electronic calculator having data input keys, said system comprising:

memory means having storage locations for storing tone codes;

tone generating means for producing audible output tones and including tone control means for selecting the frequency of said output tones in response to tone code input signals, said tone control means including register means for storing said tone code selected from said memory means, decode means for decoding said selected tone code to produce an address signal, ROM means receiving said address signal and supplying at its output in response thereto a frequency division code, and variable frequency signal generation means responsive to said frequency division code for generating a signal of predetermined frequency for controlling the frequency of said audible output tone;

means operated by said data input keys for generating key input codes indicating the identity of an activated input key;

function control means operable in response to the generation of a first key input code produced by activation of a first data input key to access a first storage location in said memory means and to supply to said tone control means a first stored tone code, whereby activation of said first data input key produces a first audible output tone; and key selection means responsive to activation of a second data input key for changing the operation of said function control means such that said first key input code accesses a second storage location in said memory means and supplies to said tone control means a second stored tone code, whereby activation of said first data input key following operation of said key selection means produces a second audible output tone having a frequency different from said first audible output tone;

said tone generating means further including:

a frequency division register for storing said frequency division code supplied by said ROM means;

a plurality of AND circuits connected such that a first input terminal of each said AND circuit receives a different digit of said stored frequency division code;

a plurality of binary counters each having a Q output, a set input, a trigger input, and a reset terminal, each said counter being connected via its reset terminal to the output of one of said AND circuits and said counters being cascade-connected through interconnection of the Q output and trigger input of respective adjacent counters;

a reference pulse generator circuit for supplying a reference frequency signal to the trigger input of the first stage binary counter;

a NOR circuit to which is applied the Q output from each of said binary counters;

a flip-flop connected to receive the output of said NOR circuit;

means for supplying the output of said flip-flop commonly to the set inputs of said binary counters and to second input terminals of each of said AND circuits; and means for producing said audible output tones having a frequency contolled by the output of said flip-flop.

* * * * *